March 10, 1964     M. J. H. STAAR     3,124,360
DICTATING MACHINE DRIVE MECHANISM
Filed March 22, 1962     10 Sheets-Sheet 1
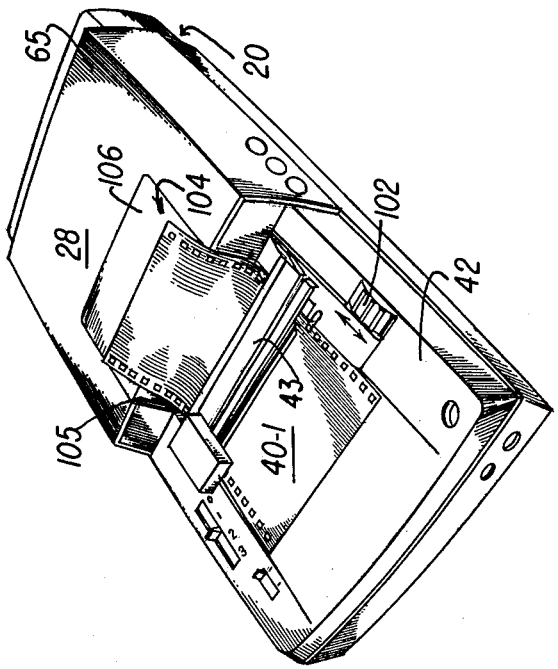
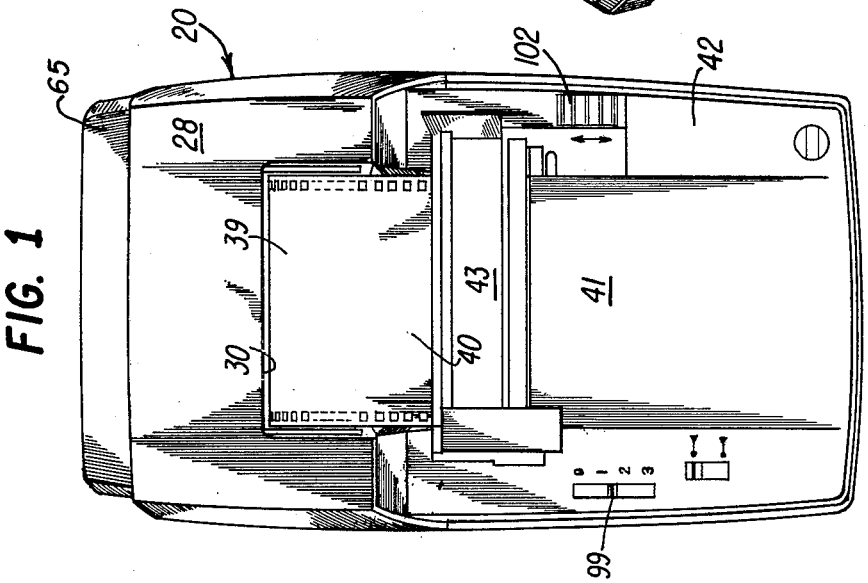
*INVENTOR.*
MARCEL JULES HELENE STAAR
BY
ATTYS.

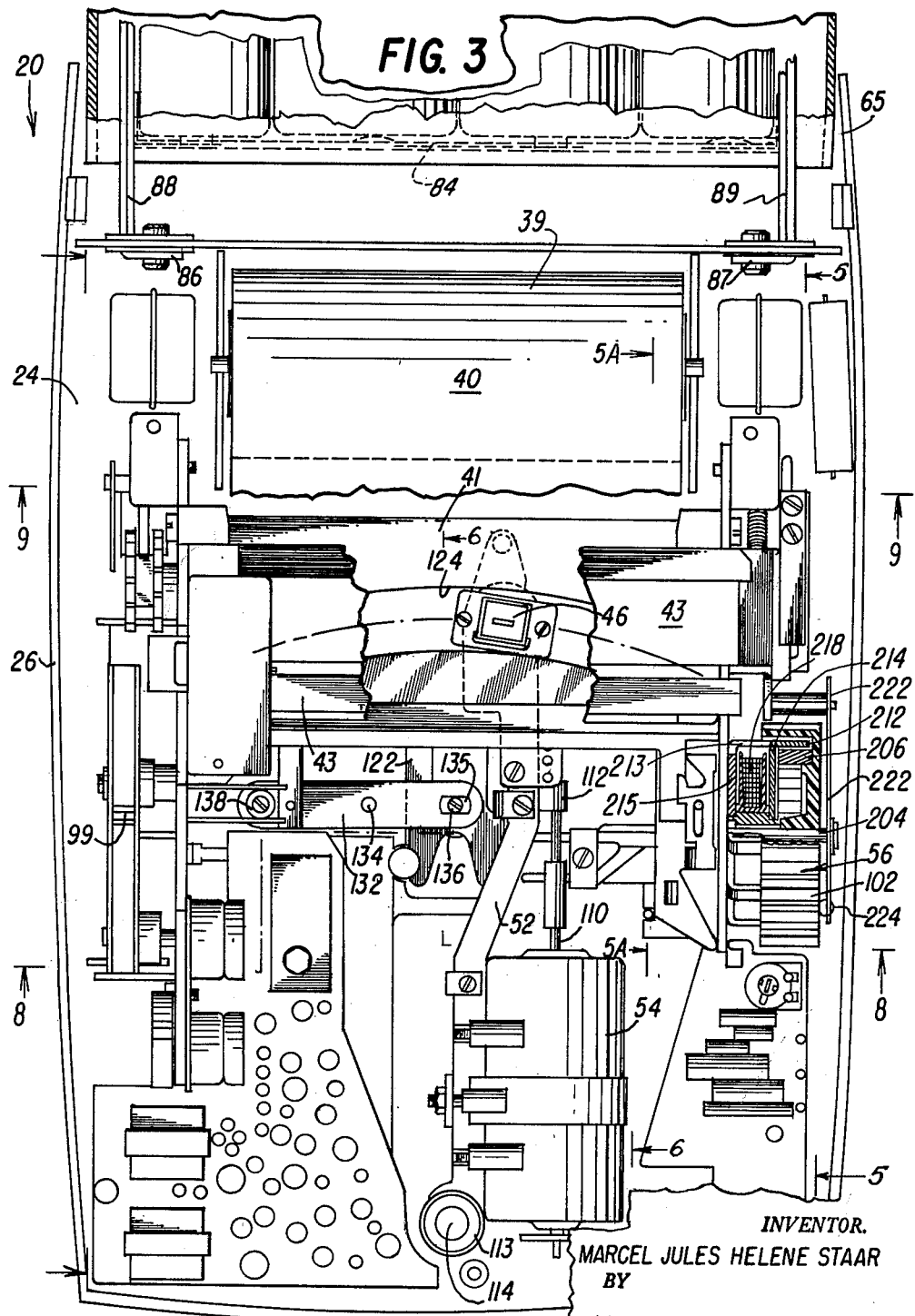

March 10, 1964  M. J. H. STAAR  3,124,360
DICTATING MACHINE DRIVE MECHANISM
Filed March 22, 1962  10 Sheets—Sheet 3
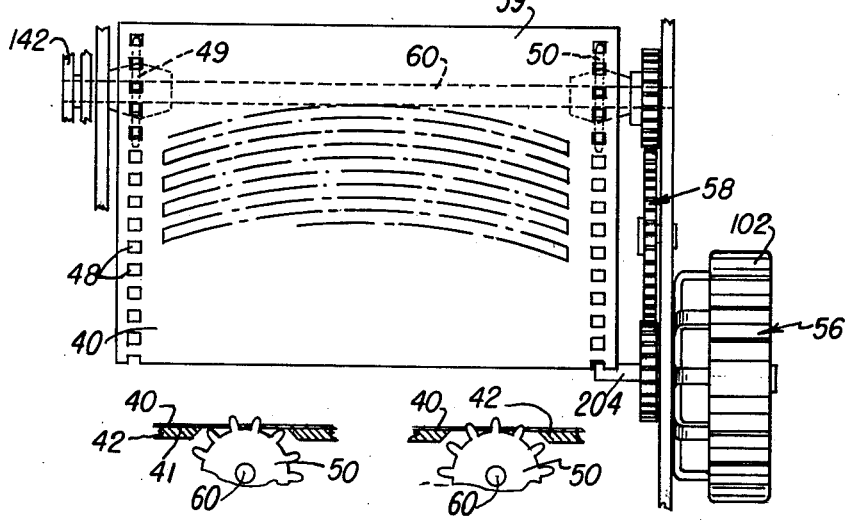
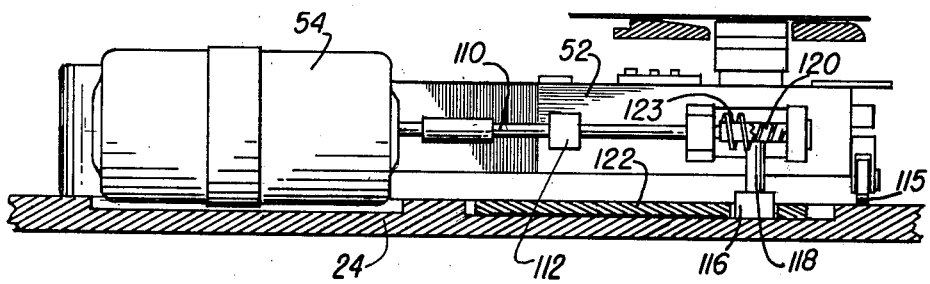
INVENTOR.
MARCEL JULES HELENE STAAR
BY
Wolfe, Hubbard, Voit & Osann.
ATTYS.

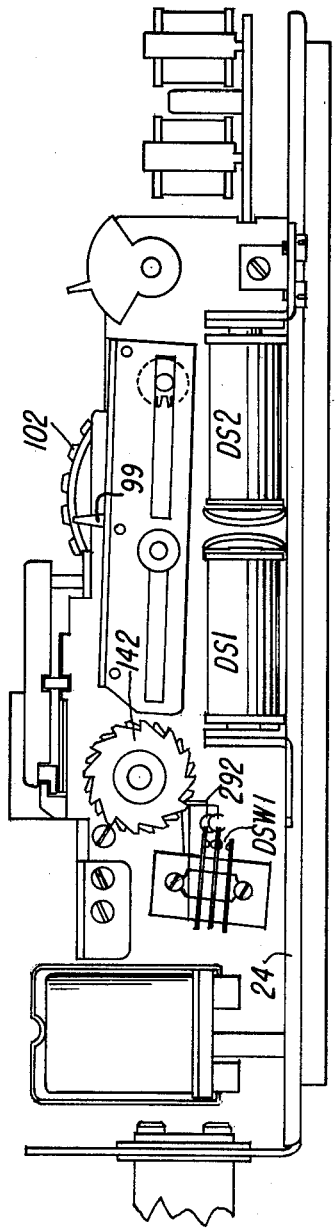
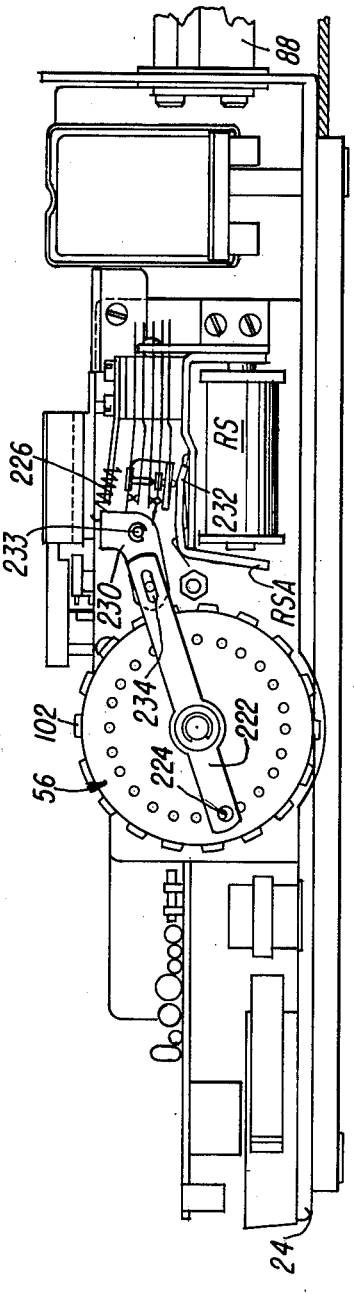

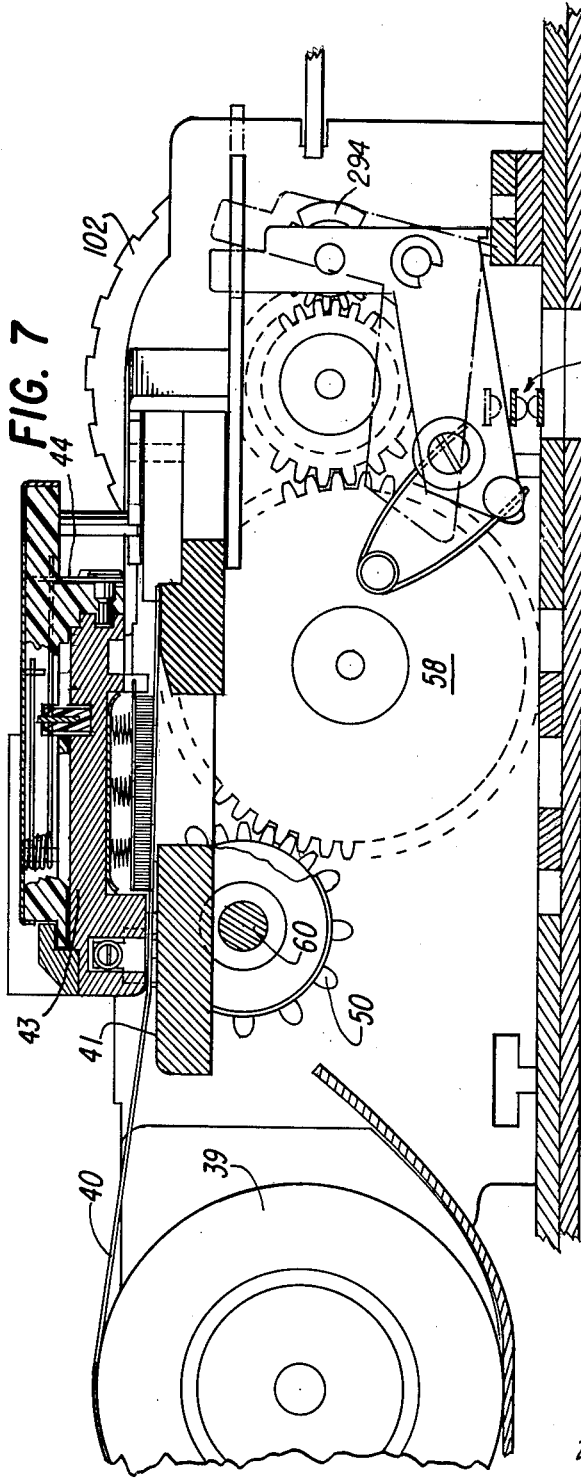
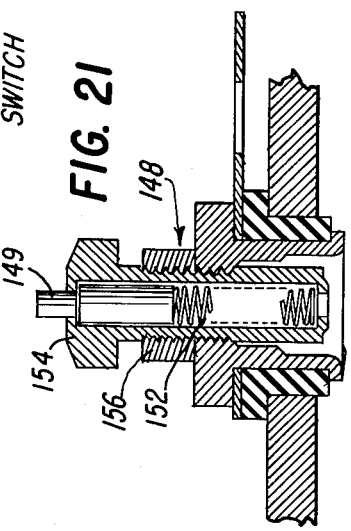
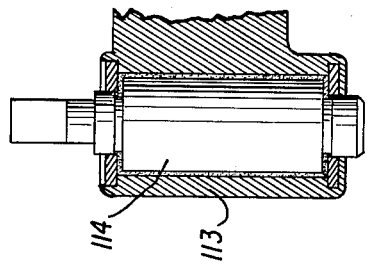

INVENTOR.
MARCEL JULES HELENE STAAR

March 10, 1964   M. J. H. STAAR   3,124,360
DICTATING MACHINE DRIVE MECHANISM
Filed March 22, 1962   10 Sheets-Sheet 7
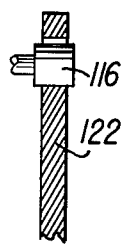
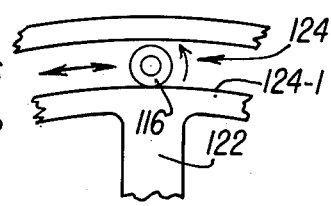
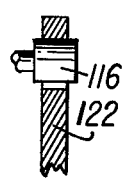
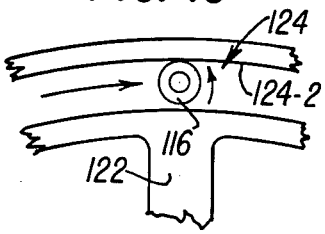
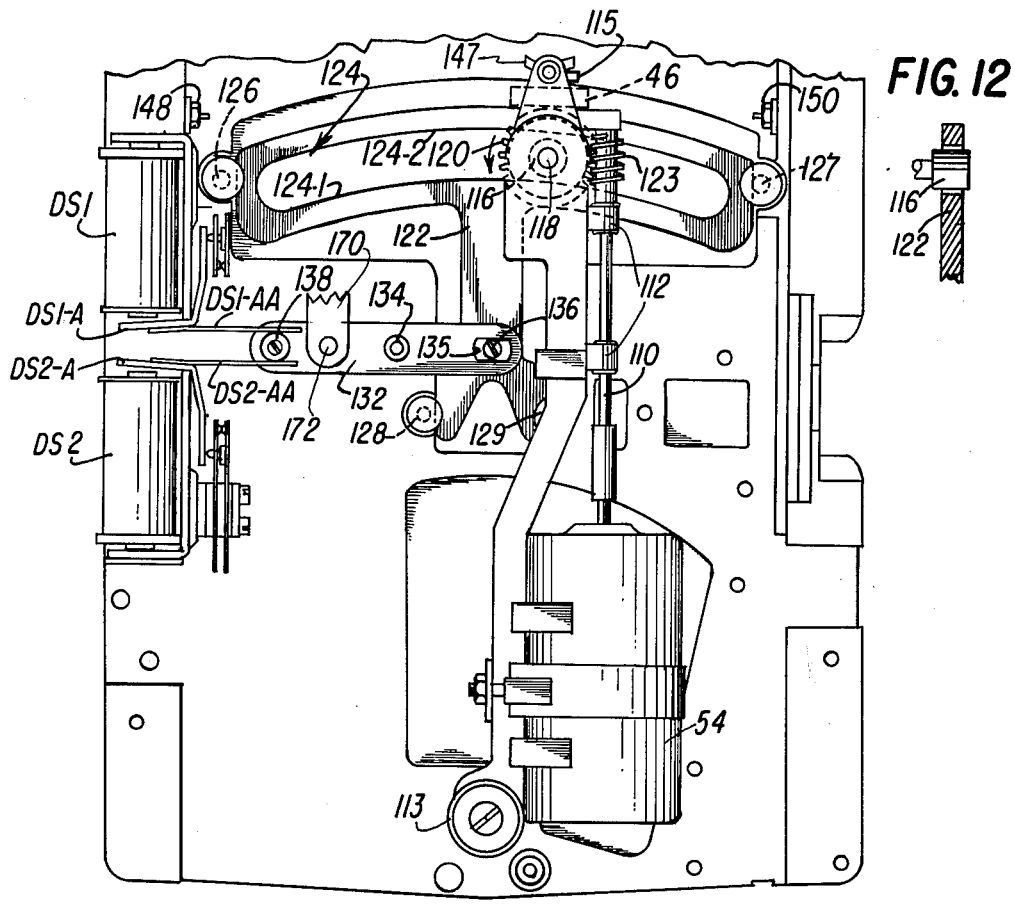
INVENTOR.
MARCEL JULES HELENE STAAR
BY
Wolfe, Hubbard, Voet & Osann
ATTYS.

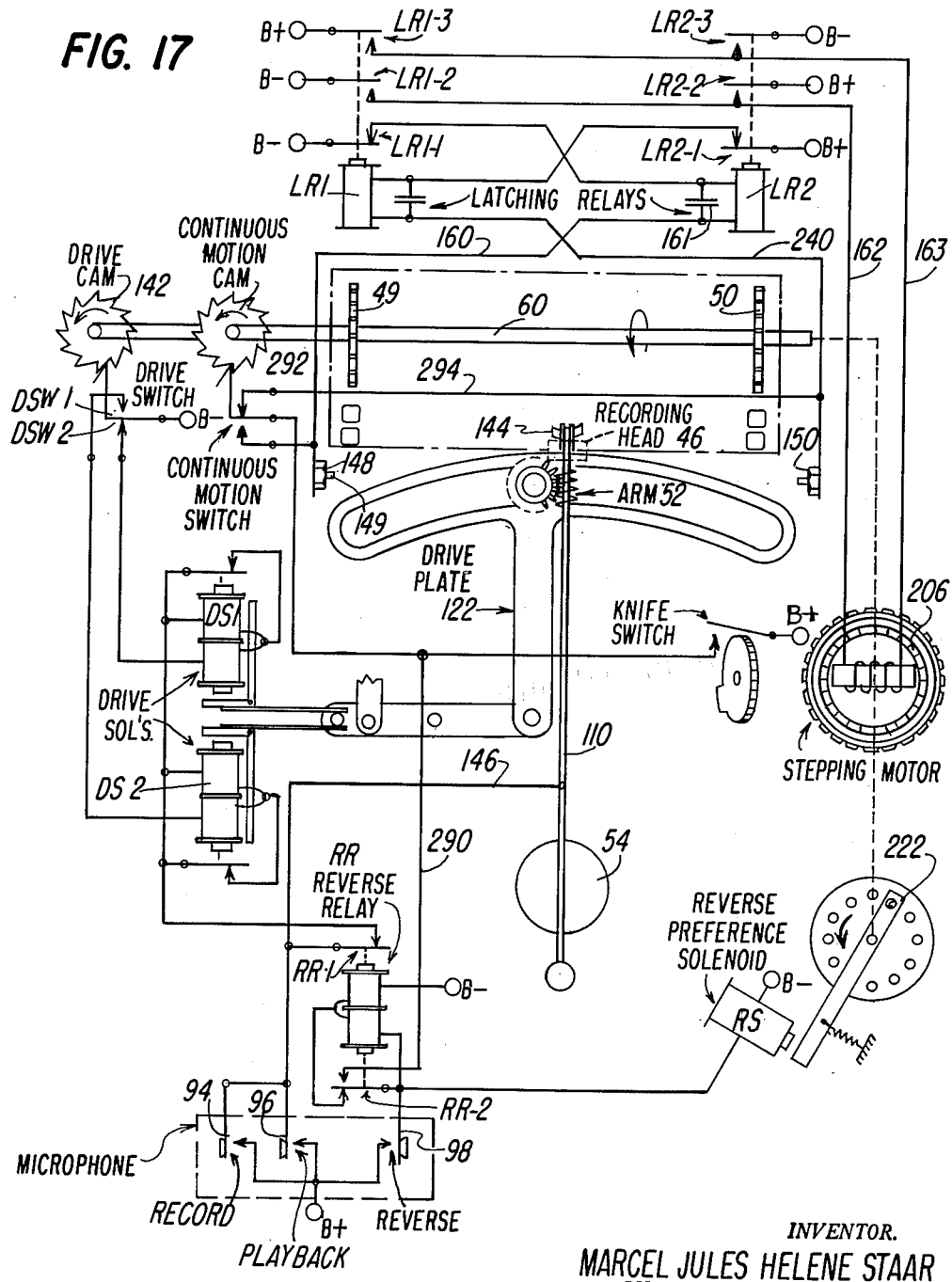

INVENTOR.
MARCEL JULES HELENE STAAR

March 10, 1964 M. J. H. STAAR 3,124,360
DICTATING MACHINE DRIVE MECHANISM
Filed March 22, 1962 10 Sheets-Sheet 10
FIG. 22
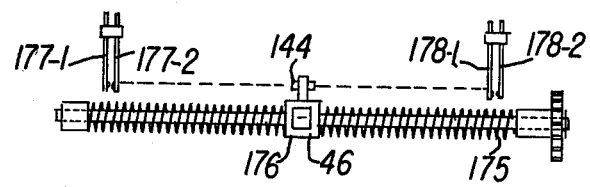
FIG. 23
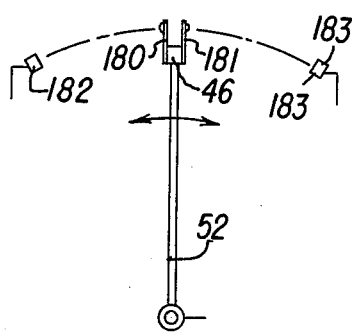
FIG. 24
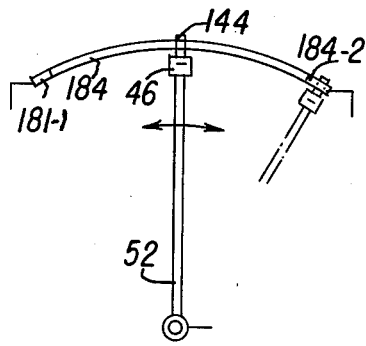
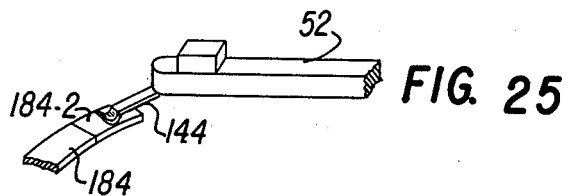
FIG. 25
*INVENTOR.*
MARCEL JULES HELENE STAAR
BY
*Wolfe, Hubbard, Voit & Osann.*
ATTYS.

# United States Patent Office 3,124,360
Patented Mar. 10, 1964

3,124,360
DICTATING MACHINE DRIVE MECHANISM
Marcel Jules Helene Staar, Brussels, Belgium, assignor to Usines Gustave Staar, S.A., Brussels, Belgium, a corporation of Belgium
Filed Mar. 22, 1962, Ser. No. 181,543
Claims priority, application Belgium July 14, 1961
21 Claims. (Cl. 274—4)

This information relates to apparatus for sound recording and playback, and more particularly to dictating machines using a relatively wide band of tape for the recording medium, wherein the recording is in the form of longitudinally spaced transverse traces across the tape.

The main object of the present invention is to provide an improved means for support and reciprocatory drive of the recording head of such dictating machine whereby low levels of vibration and constant speed of motion of the recording head are obtained.

Another object is to provide a reciprocatory drive mechanism for a recording and playback head which obtains immediate reversal at the end of each trace or stroke of the head.

A related object is to provide a drive mechanism which upon restarting after interruption immediately obtains the proper recording or playback speed.

Another object is to provide a recording head and reciprocatory drive mechanism which will stop quickly and restart or reverse trace direction immediately at any point in the trace of the head responsive to advancing or backspacing the tape.

Another object of the invention is to provide a dictating machine of the foregoing character in which the tape is stored in the machine in the form of a roll from which in an easy and foolproof manner the tape may be manually threaded into position for recording.

Another object is to provide improved support for the tape during the recording process in which the tape is unwound from the roll as an incident to being intermittently fed over the transversely reciprocating recording and playback head.

Another object is to provide for severing lengths of tape bearing recorded dictation from the continuous tape on the roll so that the dictation records are in the form of relatively short lengths of tape which may be readily handled for transcription or filing. A related object is to provide for further recording on tape from the roll without rethreading after severing record lengths.

Another object is to provide a machine of this type which may be used for recording dictation and also may be used by an operator with suitable control equipment for transcribing dictation recorded on short lengths of tape records.

Other objects and advantages will become apparent as the following description proceeds, taken in connection with the accompanying drawings, wherein:

FIGURE 1 is a plan view of a dictating machine embodying the present invention, with a roll of tape in the machine having the end of the tape inserted for recording;

FIG. 2 is a perspective view of the dictating machine shown in FIGURE 1 with a separate length of tape inserted in the machine for transcription;

FIG. 3 is an enlarged plan view of the dictating machine shown in FIGURE 1, with certain parts broken away and the cover of the housing removed to show the details of the mechanism;

FIG. 4 is a fragmentary plan view of the sprocket drive mechanism for feeding the tape;

FIGS. 4A and 4B show successive positions of each sprocket of the sprocket drive mechanism which intermittently feeds the tape through the machine;

FIG. 5 is an elevational view from the right side of the dictating machine of FIG. 3 taken substantially in the plane of lines 5—5, with parts broken away and with the side housing panel removed;

FIG. 5A is an elevational view from the left side of the dictating machine of FIG. 3 taken substantially in the plane of lines 5A—5A, and is likewise shown with parts broken away and with the side housing panel removed;

FIG. 6 is a fragmentary longitudinal sectional view illustrating details of the recording head support and drive mechanism, taken substantially in the plane of lines 6—6 of FIG. 3;

FIG. 7 is an enlarged fragmentary longitudinal view illustrating details of the sprocket drive and tape severing mechanisms taken substantially in the plane of lines 5—5 of FIG. 3;

FIG. 11 is a plan view, with parts removed or broken away for clarity of the drive and support mechanism for the recording head;

FIG. 12 is a fragmentary sectional view through the roller and slidable plate of the reciprocatory drive mechanism and illustrates the roller in neutral position as it appears in FIG. 11;

FIG. 13 is a fragmentary plan view illustrating the roller in contact with one edge of the slot in the plate, tending to move the recording head to the left as viewed in this figure;

FIG. 14 is a companion view to FIG. 13 and is a fragmentary sectional view illustrating the roller in engagement with one wall of the slot;

FIG. 15 is a fragmentary plan view illustrating the roller in engagement with the opposite wall of the slot tending to move the recording head to the right as viewed in this figure;

FIG. 16 is a companion view to FIG. 15 and is a fragmentary sectional view illustrating the roller in engagement with the opposite wall of the slot;

FIG. 17 is a diagrammatic view illustrating the reciprocatory drive mechanism for the recording and playback head, the tape drive mechanism, the electrically powered components for operating said mechanisms, and the control means therefor;

FIG. 20 is an enlarged fragmentary sectional view taken through the pivotal support for the recording head arm;

FIG. 21 is an enlarged fragmentary sectional view of the yieldable switch element employed in the reciprocatory drive mechanism of the machine illustrated in FIG. 3 for controlling the reversal of the arm;

FIG. 22 illustrates an alternative form of switch to that illustrated in FIG. 21;

FIG. 23 illustrates a further alternative form of switch to that illustrated in FIG. 21;

FIG. 24 illustrates a further alternative form of switch to that illustrated in FIG. 21; and FIG. 25 illustrates a further alternative form of switch to that illustrated in FIG. 21.

Figure 10:
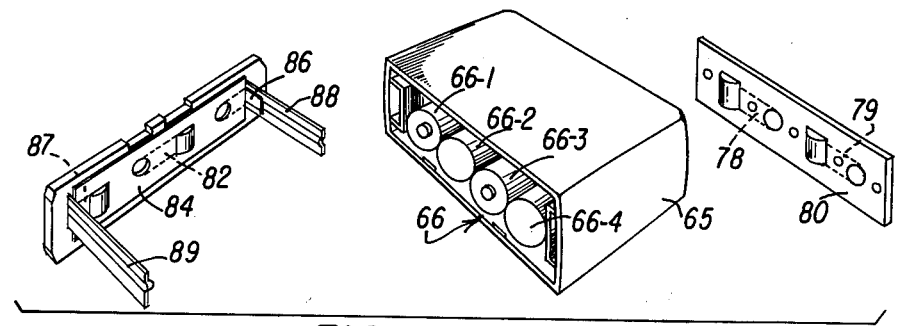
FIG. 10 is an exploded perspective view illustrating details of the removable case power supply for the dictating machine of FIGURE 1.
Figure 9:
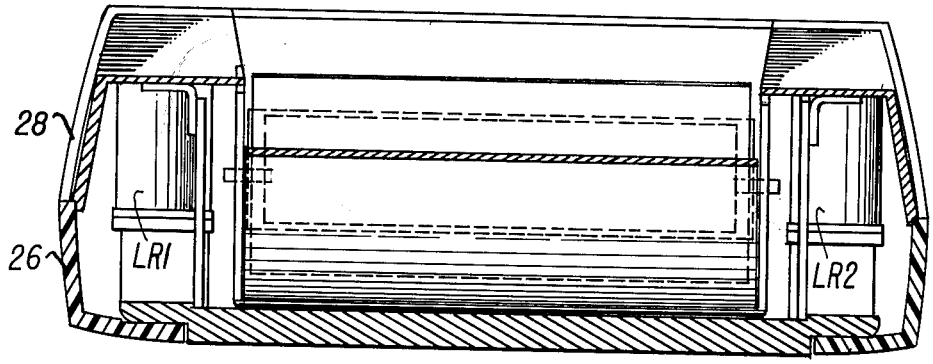
FIG. 9 is a transverse sectional view taken substantially in the plane of lines 9—9 of FIG. 3.

While the invention is susceptible of various modifications and alternative constructions, illustrative embodiments have been shown in the drawings and will be described below in considerable detail. It should be understood, however, that there is no intention to limit the invention to the specific forms disclosed, but on the contrary, the intention is to cover all modifications, alternative constructions and equivalents falling within the spirit and scope of the invention as expressed in the appended claims.

*General Machine Organization*

Figure 8:
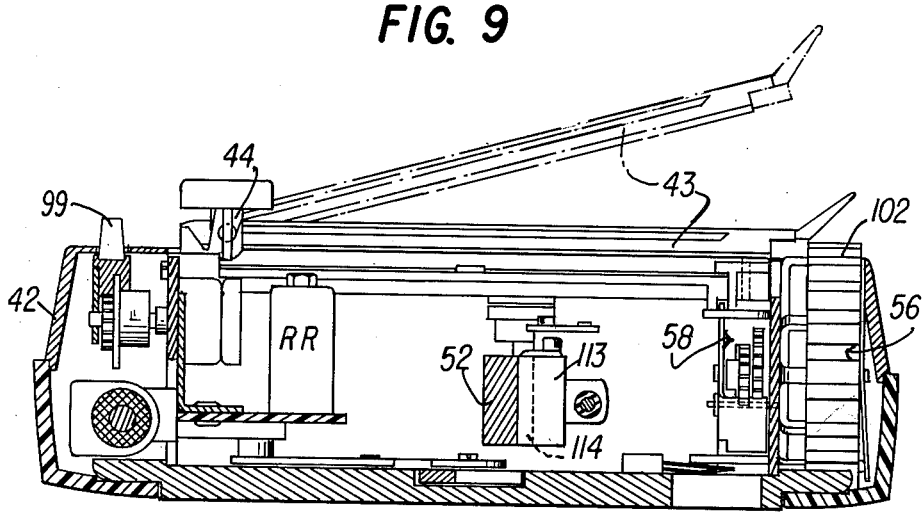
FIG. 8 is a transverse sectional view taken substantially in the plane of lines 8—8 of FIG. 3.

Upon more specific reference to the drawings, it will be perceived that the invention is there exemplified in an illustrative dictating machine 20 built in the form of a compact, lightweight unit adapted for recording (FIG. 1) or for transcription (FIG. 2). In general, such machine comprises a housing having a flat base 24 (FIGS. 3 and 8) bounded by half side walls 26 within which the components of the machine are mounted. A cover carried by the side walls 26 conceals and protects the components. The housing has a raised forward portion 28 in which a recess 30 is provided for receiving a roll 39 of relatively wide tape 40, such tape being led from the roll as shown in FIGURES 1, 3 and 7, for example, onto a flat surface 41 on a lower cover section 42, over which the tape is guided while being intermittently advanced during the recording or transcription process. A pivotally mounted bar 43 extends transversely across the machine above the tape 40 and provides support for a transversely movable knife 44 (shown in a raised position in FIG. 7) which is manually operable to sever dictation bearing lengths of tape from the roll 39. To facilitate positioning the end of the tape under the bar 42, the latter is pivotally mounted so that it may be raised to an upward position as shown in phantom in FIG. 8. The tape is advanced under the bar 43 and along the surface 41 past a transversely reciprocated recording head 46 which, as shown in FIG. 3, is located substantially in the plane of the surface 41 over which the tape is fed and is directly in contact with the underside of the tape for recording purposes. As herein shown, the tape 40 is in the form of a magnetizable layer on a backing or support of plastic film or like material, having evenly spaced perforations 48 in the margins of the tape. The tape is fed by means of a drive mechanism therefor; herein shown as including a pair of sprockets 49, 50 mounted under the margins of the tape and, as shown in FIGS. 4A and 4B, such sprockets project slightly above the supporting surface 41 for the tape to engage in the perforations 48 in the tape.

As illustrated more particularly in FIG. 3, the recording and playback head 46 is supported on a pivotally mounted arm 52 which is reciprocated transversely by a drive mechanism powered by a motor 54 carried by the arm. As illustrated more particularly in FIG. 4, the drive for the tape comprises a stepping motor 56 adapted to advance the tape in even increments of movement connected through suitable gearing 58 to a shaft 60 carrying the sprockets 49, 50 engaged in the perforations 48 in the tape 40. Synchronism between the reciprocatory movement of the recording head 46 and the intermittent advance of the tape 40, is obtained by means of a control which is shown in diagrammatic form in FIG. 17, thereby producing a recording on the tape in the form (FIG. 4) of transverse arcuate traces longitudinally spaced by the distance of each step of advance of the tape.

Referring again to FIG. 17, the components of the control are mounted within the dictating machine housing in generally the positions in which they are diagrammatically shown in this figure. A power supply for the machine components is contained within a removable casing 65 (FIGS. 1–3 and 10) at the forward end of the dictating machine housing. As shown more particularly in FIG. 10, the power supply may be provided by a plurality of flashlight batteries 66 mounted within the removable casing which may be snapped into position on the end of the housing. Alternatively, power may be supplied to the electrical control circuit from an outside current source from the usual 110 volt office power supply and a converter (not shown) within the removable power supply casing 65. In the form shown the batteries 66 are arranged side by side with alternate ones reversed in position for electrical series connection within the casing. For this purpose the bottom of the casing has conductors 78, 79 embedded in an insulating strip 80 and electrically contacted by the terminals of the batteries to place the batteries of each pair in series. The two middle batteries 66-2, 66-3 are connected in series by a conductor 82 of a front cover strip 84 for the casing. The outboard batteries 66-1, 66-4 are contacted respectively by conductors which have exposed laterally extending flexible terminals 86, 87. The entire assembly is supported on the dictating machine housing by a pair of projecting rails 88, 89 which are received within the casing 65 and which electrically contact the flexible terminals 86, 87. The rails are made of current conducting metal and serve as busses to energize the circuits of the machine.

A separate microphone 90 shown diagrammatically in FIG. 17 is connected by cable to the dictating machine and includes hand operated push buttons 94, 96, 98 or the like for controlling the operation of the machine. The power supply for the machine is connected to the control circuit as by means of the switch 99 on the left-hand side of the housing as viewed in FIGURE 1. The microphone 90, as shown diagrammatically in FIG. 17, provides means for controlling the operation of the dictating machine for recording and playback immediately of the recorded information for dictation. Thus the "Record" switch is actuated by means such as a button 96 which may be shifted to "Record" position which will start the recording process. The recording head 46 will be actuated responsive thereto and the tape will be advanced step by step, past the reciprocating recording head. The tape may be stopped by shifting the button 96 from its "Record" position and restarted at the option of the dictator. Such control on the microphone may provide for back spacing as well as for advancing the tape. In the present instance this is achieved by shifting the button 98 to its "Reverse" position.

In addition to the automatic electrically actuated drive for the tape, which will advance or back space the tape, means are also provided for manually moving the tape, herein shown as a manually operable hand wheel 102 associated with the stepping motor 56. This wheel 102 which is exposed in the right side of the housing as viewed in FIGURE 1, provides for manually turning the rotor of the stepping motor thereby advancing or backspacing the tape to any desired position. In this manner, the tape may be advanced to place a recording a substantial distance downstream of the recording and playback head, or the tape may be moved manually back to locate a previously recorded portion of dictation under the recording and playback head to enable the dictator to listen or to re-record, which is possible using magnetic tape, over the previous dictation. For the purpose of playback of previously transcribed dictation, the microphone may be provided with a pushbutton 94 having a "Playback" position in which the circuit to the head will be actuated for playback. For simplicity and convenience in illustration, the amplifier and related circuits for the recording and playback head 46 have been omitted, since they form no part of the present invention.

Room is provided in the housing, however, for the various electrical components of the recording and playback head circuits, as well as for the components of the tape drive and recording head drive mechanisms and controls therefor. These various components are shown in FIG. 3 located around the movable and fixed mechanical elements of the apparatus. As herein shown, the entire apparatus is transistorized, drawing relatively low current such that a power supply comprising four flashlight batteries 66 as shown in FIG. 10 is adequate to power the recording and playback head and the drive mechanisms for both the tape and the recording arm for extended periods without recharging or replacing the batteries, thereby providing a light, portable machine.

Referring now to FIG. 2, the machine is shown set up for transcribing a piece of dictation previously recorded on a length of magnetic tape 40-1. It will thus be seen that the record is in the form of a length of tape which is laid on the upper housing section 28 and extends therefrom under the pivotal bar 43 which extends transversely across the machine. One of the major features of the present dictating machine is the provision of means including the knife 44 supported by the arm 43 for movement across the tape, for severing the tape after the dictation has been completed so as to separate the tape from the roll and to provide the record in the form of a short length of tape. In this way, the record may be easily handled either to be transcribed, filed, or mailed in the usual mailing envelope. To facilitate handling the relatively short piece of tape, the housing is provided with a removable cover insert 104 which may be positioned over the deep well or recess in which the roll 39 of magnetic tape is stored. This cover insert 104 as shown in FIG. 2, thus presents an inclined forward surface 105 and a flat top surface 106 concealing the recess and providing for support of the short length of recording tape. As shown in FIG. 2, the tape record 40-1 has progressed from an initial position in which the leading edge of the tape is positioned under the bar 43 and engaged in the sprockets much in the same manner that the end of the tape is positioned in FIGURE 1. During transcription as during recording, by means of the sprocket drive the tape is advanced intermittently past the reciprocating recording and playback head 46. For convenience and in keeping with the usual practice, the transcriber may use a headpiece, including an earphone, for listening to the dictation and may employ foot operated controls for advancing and backspacing the tape during the transcription process. It is contemplated that the same machine will be used for both dictation and transcription, separate means for connecting the transcription equipment and foot controls being provided as suitable.

*Recording and Playback Head-Reciprocatory Drive Mechanism*

Turning now to the means for support and drive for the recording and playback head in greater detail, the structural aspects of the mechanism will now be considered. In the present instance, referring to FIG. 3, the recording and playback head 46 is supported adjacent the free end of a pivotally mounted arm 52, the pivotal support for the arm being at the opposite end thereof. This arm is offset intermediate its ends to receive the motor 54 which is strapped to the arm or otherwise fixed thereon. With the offset, the motor drive shaft 110 extends forwardly along the side of the outer portion of the arm 52 and is supported in the bearings 112.

Still referring to FIG. 6, it will be seen that the pivotally mounted end of the arm 52 is fixed to an upright tubular member 113, as shown in detail in FIG. 20, which, in turn, is received on a shaft or post 114 fixed to the base plate 24 of the housing. As shown in FIG. 20, the pivotal support for the recording head arm is packed with silicon grease or a similar viscous material having the effect of dampening the pivotal movement of the arm to the end of reducing vibration and providing for smoother, more uniform speed of movement of the arm.

In the present case, the arm is supported at the free end carrying the recording and playback head 46 by means, shown in FIG. 6 as a roller 115 rotating about a horizontal axis and riding along a surface presented by the base plate 24 of the housing. Provision for support of the arm at both ends also steadies the arm in its operation tending to reduce vibration and increase smoothness of operation.

Adjacent the free end of the arm 52, referring to FIGS. 6 and 11 is mounted a rotary drive roller 116. The drive roller is supported on a vertical axis by means of a shaft 118 having a pinion 120 at the upper end of the shaft 118 which is in mesh with a worm gear 123 carried by the motor shaft 110. Power is supplied to the motor 54 from the power supply, herein shown as the batteries 66 in FIG. 10, so that the drive roller 118 is continuously operated by the motor, when the switch 99 is turned on and the machine is being used for recording or transcribing dictation.

The reciprocatory drive mechanism for the head 46 further includes a slidable plate 122 (FIGS 6 and 11) which is flat on the base 24 of the housing and is provided with a horizontal arcuate slot 124 through which the vertical drive roller 116 projects. The plate 122 is movable in a direction axially of the tape 39 to position one wall of the slot or the other wall of the slot in engagement with the drive roller such that upon continuous rotation of the drive roller by the motor a reaction force is set up tending to move the pivotal arm 52 in one direction or the other. The drive roller 116 is shown in FIG. 12 in a neutral position free from engagement with either wall of the slot and, in FIGS. 13 and 14, moved from the neutral position to a position engaged with one wall 124-1 of the slot. With the plate in the position of FIG. 13, upon normal counterclockwise rotation of the drive roller 116, the arm 52 and head 46 carried thereby will be pivoted from right to left as viewed in this figure. By moving the slidable plate 122 in the opposite direction to position the drive roller as shown in FIG. 15, in engagement with the upper wall 124-2 of the slot, with the drive roller operated counterclockwise, the arm 52 and head 46 will be driven from left to right.

The slidable plate 122 is generally T-shaped with the arcuate slot 124 extending across the bar of the T. The outer ends of the bar of the T are straight, as shown in FIG. 11, and extend parallel to the axis of the tape 39 and are loosely held between headed studs 126, 127 which are fixed to the housing base member. The heads of the studs overhang the ends of the cross bar of the plate 122, thus preventing the plate from lifting. The shafts of the studs 126, 127 which extend vertically and adjacent the ends of the cross bar, prevent substantial side play of this end of the plate. The shank of the plate 122 is similarly supported for axial movement parallel to the tape and constrained against transverse movement between a pair of headed studs 128, 129 fixed to the base plate 24 of the housing. In a similar manner to the support at the ends of the T bar, these studs overhang the plate and the latter fits between the shafts of such studs with a loose fit to restrain the plate against side play.

For positioning the plate 122 to engage one wall or the other wall of the slot 124 with the drive roller 116, means are provided herein shown as a pair of drive solenoids DS-1, DS-2 arranged normally to a pivotally mounted lever 132 which transmits the motion of the solenoids to the slidable plate. In the present case, the connecting lever 132 is pivotally supported on a pin 134 fixed to the base plate 24. Lost motion connection is provided between the lever and the slidable plate by means of an elongated slot 135 in the lever and a pin 136 fixed to the plate. The solenoids for actuation of the slidable plate each include armatures DS1-A, DS2-A which are pivotally mounted such that when one of the solenoids is energized to pick up its armature, the latter pivots about an intermediate point of support, the pivotal motion of the armature being transmitted by an arm DS1-AA, DS2-AA extending from the armature to the connecting lever. For this purpose the end of the connecting lever 132 adjacent the solenoids DS1, DS2 has a pin 138 which fits between the arms carried by the solenoid armatures. It is contemplated that one or the other of the solenoids will be energized to shift the plate between alternate positions of engagement, as shown in FIGS. 13 and 15, for example, The two drive solenoids DS1, DS2 which control the plate position and thus form components of the reciprocatory drive mechanism, are shown in the diagrammatic view of FIG. 17 in positions corresponding to the positions which they actually occupy in the dictating machine housing. Referring to this figure, it will be seen that the solenoids DS1, DS2 connected to a source of supply indicated conventionally as B+ via the conductor 140 and the normally closed contacts RR–1 of the reverse relay RR, when either the "Record" or "Playback" switch of the microphone or like control instrumentality is closed. The circuit is completed through one of the solenoids DS1, DS2 by means of alternately operated drive switches DSW1, DSW2 which are connected in series with the solenoids and the return side of the circuit herein shown conventionally as B—. As will be evident from FIG. 17, such switches DSW1, DSW2 are alternately operated by a drive cam 142 on the sprocket shaft 60. The cam 142 operates the switches via an actuator and is fully reversible. It will be noted that with the circuit energized, and the microphone switch on either the "Record" or "Playback" position, the plate 122 will be shifted to a position corresponding to a position of the sprocket shaft and thus the tape.

As will be set out in more detail hereinafter, with one of the drive solenoids DS1 or DS2 of the reciprocatory drive mechanism energized, the recording and playback head 46 will be driven in one direction or the other across the tape, and such movement will continue until the trace is completed. Responsive to the completion of each trace, the other solenoid DS1 or DS2 will be energized to shift the plate 122 and reverse the direction of motion of the head.

For the purpose of alternately operating the drive solenoids DS1 or DS2 for the riciprocatory drive mechanism responsive to the completion of each trace of the head, referring to FIGS. 17 and 21, the arm 52 carries adjacent the outer end of the arm a pair of electrically energized switch contacts 144. The contacts at the end of the arm 52 are energized, as will be apparent from FIG. 17, via the conductor 146 which energizes the arm, upon closing either of the switch buttons on the microphone labelled "Record" or "Playback." In the course of the transverse trace of the arm, one of the contacts 146 thereon facing forward in the direction of movement engages a yielding part of a switch member 148, 150 located adjacent the end of the path of the arm to close a circuit. Thus, moving from right to left as viewed in FIG. 17, the contact 144 on the left-hand side of the arm 52 engages the yielding pin 149 of a switch member 148 positioned adjacent the left-hand side of the plate. The switch assembly 150 on the right side of the machine has the same construction. From the details of this switch assembly, shown in FIG. 21, it will be seen that the pin 149 of the switch assembly is biased outwardly by a compression spring 152. The position of the collar 154 supporting the pin 149 may be adjusted lengthwise by screwing the same within the supporting member 156. This permits very precise adjustment over the actual position of the pin and of the point at which the pin 149 will be contacted by the moving arm. With the contacts 144 on the arm 52 energized and the pin 149 electrically connected to the supporting elements 156 thereof, the switch assembly forms a terminal which, as shown in FIG. 17, is connected in the control means to provide a signal responsive to the completion of each trace of the arm. This is achieved in the present instance by connecting the switch assemblies 148, 150 to a pair of latching relays LR1, LR2. By means of the control circuit including the latching relays LR1, LR2, the tape drive and reciprocating drive for the head are synchronized. How this is achieved will be set out more completely later. At this point, it will be noted that in the operation of the unit, with the sprocket shaft 60 positioned as shown in FIG. 17, and the upper drive solenoid DS1 of the reciprocatory drive mechanism connected through the drive switch DSW1 to B—, the picking up of the armature of that solenoid DS1 will move the drive plate 122 upwardly as viewed in FIG. 17 to engage the lower edge of the slot 124 with the roller 116. With the roller 116 rotating counterclockwise, this will cause the arm 52 to sweep toward the left. Responsive to the contact 144 at the end of the arm engaging the yieldable switch means 148 at the left-hand side of the plate and adjacent the left end of the path of the arm, B+ will be connected through the conductor 160 connected to that switch, to the latching relay LR2 at the upper right-hand portion of FIG. 17. It will be seen that the relay will be energized and held energized for a brief period by means of the condenser 161 across its input terminals, picking up a pair of contacts LR2–2, LR2–3 which connect the B+ and B— via conductors 162, 163 to means herein shown as stepping motor 56 for the tape drive. This effectively reverses the polarization of the stator of the motor 56, causing it to advance one step. With the drive cam 142 at the end of the sprocket shaft 60 shifted ahead one step from the position shown, the drive switch 142 associated therewith will be moved to its upper alternate position thereby deenergizing the first drive solenoid DS1 and energizing the other solenoid DS2 thereby causing the plate 122 to be shifted in position to engage the upper edge 124–2 of the slot 124 with the drive roller 116, thereby reversing the direction of motion of the arm 52 so that it moves to the right as in FIG. 17.

The yieldable switch means 148 or 150 at the end of each stroke serves the additional function of imparting an impulse to the arm to start its return motion thereby assisting the arm in recovering recording speed more quickly. It will be noted that this switch means 148 or 150 is energized at a point before the actual termination of the stroke of the arm and the arm continues for a predetermined short interval after the period of initial actuation of the switch continuing to stress the compression spring 152 (FIG. 21) and moving the pin 149 the maximum distance until the contact on the arm reaches the abutment surface presented by the rigid collar 154 of the switch assembly. One of the advantages of this arrangement is that the actuation of the switch means prior to the actual termination of the stroke at least partially compensates for the delay period between energizing of the latching relays LR1 or LR2 in the control circuit and the shifting of the plate 122 which actually produces the reversal of motion of the arm. One of the main features of the present invention is to reduce to as short a period as possible and to make as immediate as can be possible the reversal of the direction of movement of the arm. It has been found that with the present arrangement there is no audible interruption in recorded speech on the record during the period of reversal including the longitudinal path that the recording trace follows between successive arcuate traces.

A feature of the drive mechanism is the use of an irreversible drive train including the worm and pinion drive between the drive motor 54 on the arm 52 and the drive roller 116, such that changes in pressure on the drive roller due to shifting of the plate 122 at stroke completion have little or no effect on its speed of rotation due to the high camming angle between the teeth of the pinion and the worm gear thereby to produce substantially continuous and uniform rotational speed of the drive roller and corresponding uniform motion and speed of the recording arm in its transverse traces.

Another feature of the reciprocatory drive mechanism is the provision of a neutral position so as to free the drive roller 116 from engagement with the plate 122 when the mechanism is at rest. For this purpose, as shown particularly in FIG. 11, resilient means is provided for urging the pivotal connection lever 132 which controls the position of the slidable plate 122 of the mechanism, to a neutral position wherein the roller 116 will be free from engagement with the slot 124-1 or 124-2. This is achieved in the present case by a resilient leaf 170 carrying a ball 172 which seats in an opening 174 of the lever 132 and tends to resiliently urge the lever to its neutral position. When either of the solenoids of the mechanism are actuated the lever may be readily moved from its neutral position, the ball riding up on the edge of the holder detent in which it is fully seated in the neutral position. When the machine is out of use for extended periods, there will be no flattening of the roller with the roller free from engagement with the walls of the slot.

*Alternative Switch Means*

In FIGS. 22-25 are shown alternative embodiments of the yielding switch means 148 or 150 adapted for engagement by the arm 52 at the completion of each trace.

Referring to FIG. 22, it will be seen that as shown for illustrative purposes, the reciprocatory drive for the recording head 46 is by means of a positioning screw 175 having threads of a single hand coacting with a nut 176 supporting the recording head. In this arrangement, it is contemplated that the drive will be reversed by reversing the direction of rotation of the screw 175 to change the direction of movement of the head. The yielding switch means shown in this figure are in the form of spring contacts 177-1, 177-2, 178-1, 178-2 positioned adjacent the ends of the path of the head and in alignment with the head such as to be engaged thereby prior to the end of the stroke. The switches in this case each include a pair of yielding blades which are closed upon engagement by the contacts 144 on the head, thereby causing, through suitable control means, the reversal in direction of rotation of the shaft. The switches at either end of the path of the head will be stressed for a predetermined period after initial actuation and upon reversal of rotation of the screw 175, tend to impart an impulse to assist recovery to recording speed of the motion of the head.

In FIG. 23 a further alternative form is shown wherein the contacts on the head 46 are yieldingly carried by resilient arms 180, 181. It will be noted that upon completion of the trace at either end of the stroke, one of the arms 180 or 181 and its contact engages a fixed contact 182 or 183 and, again, the arm 52 receives an impulse to start it on its return stroke.

Turning now to FIG. 24 and 25, in these figures the contact 144 at the end of the arm 52 slides along a curved track 184 the end portions 184-1, 184-2 only of which are electrically conductive such that upon engagement by the energized contact 144 a circuit will be completed. The arrangement is the same in both ends of the path of the arm. In the form of the invention shown in this figure, the switch means are actuated and the circuit is closed through the switch means prior to the end of the stroke and the switch remains actuated for a period after initial actuation. Continuing motion of the arm and the elongated shape of the fixed contact permits the movable contact to remain in engagement therewith for the terminal portion of the stroke. It will be noted that with this arrangement there is no yielding of a resilient means such as to impulse the arm on the return stroke.

*Tape Drive*

The drive for the tape, as shown in FIGS. 4 and 11, comprises a pair of sprockets 49, 50 on a sprocket shaft 60 operated by a stepping motor 56. This stepping motor device, which is described more fully in the copending application of Marcel Jules Helene Staar, Serial No. 181,544, filed March 22, 1962, entitled: Stepping Motor Device, comprises a rotor 202 (FIG. 3) which is supported on a horizontal shaft 204 carried on the frame of the machine and is connected through suitable gearing 58 to the sprocket shaft. The rotor includes, as also shown diagrammatically in FIG. 17, an annular ring made up of permanently magnetized segments 206. These segments are polarized such that adjacent segments have the opposite polarity. The ring of rotor segments is fixed to the wheel 102 made of non-magnetizable material, such as plastic, which has an outer rim spaced outwardly of the ring of segments 206 forming the rotor. The outer rim of the wheel 102 projects above the upper surface of the housing and is accessible for manual operation to rotate the sprocket shaft directly.

The stator of the stepping motor (FIG. 3) includes a plurality of circumferentially spaced, relatively narrow pole pieces carried in an annular ring outside of the ring of rotor segments 206. These pole pieces are formed as parallel bars or teeth 212, 213 extending from a pair of axially spaced plates 214, 215 parallel to the axis of the stepping motor shaft 204 and evenly spaced about the ring of rotor segments. Still referring to FIG. 3, which illustrates the stepping motor with the plastic rim broken away to reveal the stator, it will be seen that the bars or teeth 212, 213 forming the stator are arranged so that every other tooth is carried by the same plate 214 or 215 so that the teeth from one plate are interposed between the teeth carried by the companion plate. In the present case, the number of teeth and thus poles of the stator corresponds to the number of segments 206 of the rotor. Each stator pole piece is part of a magnetic circuit including a stator coil 218. The coils are wound so that every other stator tooth or pole piece has the same polarity and the interposed tooth or pole piece has the opposite polarity, as indicated by the arrows in FIG. 3.

Accordingly, it will be seen that for any polarization of the stator poles the rotor will have positions in which the rotor segments 206 are located adjacent pole pieces of the stator having opposite polarity. Upon reversal of polarization of the stator poles, the rotor will be placed in an unstable condition since adjacent poles of the stator and segments of the rotor will have the same polarity, tending to urge the rotor circumferentially in both directions. The instability will result in the rotor turning in whatever direction it is initially started, by one step to its new position.

According to one of the features of the stepping motor arrangement, means are provided to mechanically produce a preference urging the rotor of the stepping motor in one direction or the other. Means are provided for urging the rotor in either the forward-advance direction or in the reverse-back space direction. For this purpose, referring to FIG. 5, the side of the hand wheel 102 of the stepping motor 56 includes a circle of evenly spaced wells or openings 220. Mounted across this face of the stepping motor wheel 102 is an arm 222 carrying a ball 224 adjacent its outer end seating in the wells or openings 220 in the side of the stepping motor wheel. As shown in FIG. 5, the arm 222 is pivotally mounted on the stepping motor shaft 204 so that it may be pivoted slightly clockwise from the position shown, being resiliently held in the position shown by a tension spring 226. In the position of the arm 222 shown, the ball 224 is supported by the arm on the lower edge of the opening just under the ball in the side of the stepping motor wheel such that the ball, which is being resiliently held against the side of the wheel, acts on the lower edge tending to urge the wheel in the counterclockwise direction. With this preference active in the manner shown, upon reversal of polarity of the stator poles, the rotor will be given sufficient initial urging for it to advance one step whereupon the ball rides up out of the first opening and down into the next opening.

With this same preference means, the stepping motor may be controlled to step in the reverse direction. This is achieved by pivoting the arm 222 and ball 224 clockwise to move the ball to the opposite side of the opening or well beneath the ball and bear against that side, thereby tending to urge the wheel of the stepping motor in clockwise direction. Via the gear means to the sprocket shaft 60 of the tape drive mechanism, counterclockwise rotation of the stepping motor as viewed in FIG. 5 produces advance motion of the tape and clockwise rotation of the stepping motor produces back spacing.

The position of the arm 222 which imparts the preference to the stepping motor 56 to rotate in one direction or the other, is under the control of a reverse solenoid RS which appears in FIG. 5 and which also appears in the diagrammatic illustration of FIG. 17. Referring first to FIG. 5, the end of the arm 222 adjacent the solenoid RS is connected to be operated by the solenoid armature RSA. A pivotal lever 230 is included in this connection. The solenoid armature RSA is a right-angle member, pivotally mounted at the corner of the member such that when the armature is drawn up by the energization of the solenoid, the right-angle portion thereof 232 is moved upward to engage the pivotal lever 230, pivoting the latter about its pivot 232 and causing clockwise rotation of the arm 222. The two levers 222, 230 are connected with a lost motion pin and slot connection 232.

Now referring to FIG. 17, the arrangement is shown diagrammatically in this figure, including the reversing solenoid RS which, with the reversing switch 98 on the microphone closed, is energized to pick up its armature RSA and thereby rotate the preference arm 222 in a clockwise direction. This will tend to rotate the stepping motor in a clockwise direction to back space the tape.

*Controls for Recording Head and Tape Drive*

Having in mind the reciprocatory drive mechanism for the arm supporting the recording and playback head 461 and the stepping motor drive for the tape, consideration may now be given to the controls for synchronizing these drives. From FIG. 4 it will be seen that the distance from center line to center line of adjacent perforations in the tape is an even multiple of the longitudinal spacing between adjacent transverse traces. As therein shown, the tape is advanced one-half of the distance between the center lines of adjacent perforations each step of the intermittent drive and, hence, of the stepping motor. This is represented by FIGS. 4A and 4B which show the same sprocket 49 or 50 in successive positions. With this arrangement, each trace from left to right, as viewed in FIG. 4, begins substantially on the center line of a perforation, and each trace from right to left begins substantially intermediate the perforations. It will be noted that with this arrangement the direction of motion of the head is dependent upon the position of the tape 40. The position of the tape, in turn, is dependent upon the angular position of the sprocket shaft 60 and the position of the sprockets. Thus, when a short length of tape is placed on the machine for transcribing, for example, as shown in FIG. 2, the length of tape is automatically positioned so that the recording head, when the drive is started, will be travelling in the same direction as the head travelled when the trace was originally recorded. Similarly, the drive mechanism for the tape and the direction of motion of the recording head are synchronized during the recording process so that if the tape is back spaced or moved ahead to shift between previously and presently recorded pieces of dictation, the head will always be travelling in the same direction when the tape is stopped as it travelled when the trace was originally recorded. How the direction of motion of the recording head is made dependent upon tape position and sprocket shaft position, will be more readily apparent from FIG. 17. The drive cam 142 which is carried on the end of the sprocket shaft 60, is shown in position with the actuator for the drive switches DSW1 and DSW2, riding on a high point of the cam and thus closing the switch DSW1. The drive solenoid DS1 is thereby energized. One step counterclockwise from the sprocket position as shown, the drive switches actuator will drop into a deep portion of the cam, thus closing the other drive switch DSW2 and opening the first switch DSW1. This will change the state of the drive solenoids DS1 and DS2 contacts. In the position as shown, the drive switch, which is connected to the B— or the return, connects the said B— to the upper solenoid which, when energized, will draw up its armature and thereby move the dial plate in an upward direction, as viewed in FIG. 17. With the first drive solenoid DS1 energized and the drive plate 122 moved thereby to the upward position (as shown in FIG. 13) the recording arm 52 moves to the left. With the drive cam 142 in its other position and the drive switches in their alternate position, after a single step of advance by the stepping motor, the other drive solenoid DS2 will be energized lowering the drive plate and causing, as shown in FIG. 15, the recording head to move to the right as viewed in that figure and FIG. 17. The foregoing drive cam 142 on the sprocket shaft obtains synchronization between sprocket shaft-tape position, and direction of movement of the recording and playback head.

In addition, the present invention provides means for synchronizing the reciprocatory drive for the head with the tape drive so that the tape is automatically advanced a single step upon the completion of each transverse trace thereby to produce a continuous succession of recording traces in alternate directions longitudinally spaced by the distance of advance of the stepping motor, as shown in FIG. 4. In the present instance, this is achieved by the circuit at the top of FIG. 17 including the latching relays LR1, LR2 and the yielding switch means 148, 150 mounted on the ends of the path of the recording head. As shown in FIG. 17, with the recording head moving in either direction from right to left, upon actuation of the switch means 148 at the left end of the path, the switch means including the contact 144 on the arm 52 and the contact 148 engaged thereby, connects B+ with which the arm is energized through the conductor 160 leading to the right-hand latching relay LR2. Energizing this relay LR2 connects the stepping motor 56 to the power supply thereby causing the stepping motor to advance one step from its prior position.

To cause the stepping motor to operate it is only necessary to energize the stepping motor 56 for a short interval sufficient to reverse the polarity of the stator pole pieces and thereby create the instability of the rotor due to the similar polarization of the rotor segments. The rotor will rotate in the direction dictated by the mechanical preference means. Thus, with the reverse solenoid RS deenergized, as in the usual recording process, the preference arm 222 is positioned to tend to urge the stepping motor rotor in the advance counterclockwise direction and will shift the rotor a small angle ahead of its position under the resilient urging of the arm, thereby causing the rotor to move one step to an interlocked position wherein the stator poles are positioned adjacent rotor segments of opposite polarity. Continued energization of the stepping motor stator is not necessary since the permanent magnet rotor segments link the adjacent pole pieces with the flux of the permanent magnet fields thereby resiliently maintaining the stator and rotor in circumferential position with the stator pieces in alignment with the rotor segments but for the slight circumferential movement produced by the preference means.

A single advance step of the stepping motor produces motion of the tape drive and corresponding motion of the drive cam 142 and change in state of the drive switches DSW1, DSW2 for the drive solenoids, thereby reversing the position of the drive plate and producing reversal in direction of motion of the recording head. With the head moving toward the right, therefore, the motion of the arm 52 will continue until the switch contacts 144 carried by the arm 52 engage the yielding switch means 150 at the end of the path of the arm connecting B+ with which the arm is energized, to the left-hand latching relay LR1 via the conductor 240. This relay LR1 is energized to pick up its contacts LR1-2, LR1-3 thereby connecting the power supply to the stepping motor 56 but of the reverse polarity; that is to say, B— is connected to the bus 162 and B+ is connected to the other bus 163 leading to the stepping motor. With the stator pole piece polarities thus reversed, the stepping motor will be caused to advance one step, advancing the sprocket drive and thereby the tape one step. Producing a single step of advance of the sprocket shaft shifts the drive cam 142 thereby changing the state of the drive solenoids DS1, DS2, thereby reversing the position of the drive plate and the direction of motion of the recording head.

Further, according to the present invention, the control means provides for continuous stepping movement of the tape. Referring to FIG. 17, continuous stepping movement in the reverse or back spacing direction will be achieved upon actuation of the "Reverse" button 98 of the microphone. With the "Reverse" button actuated, the reverse relay RR picks up its contacts RR-2 connecting the power supply over the conductor 290 to the continuous motion switch 292. It will be seen that in the position of the switch 292 shown, the conductor 294 is energized and conveys power to actuate the latching relay LR1. This reverses the polarity of the current supplied to the stepping motor over the busses 162, 163 causing the stepping motor to advance one step. Because the continuous motion cam is in the sprocket shaft 60, the advance of the stepping motor changes the state of the continuous motion switch 292, releasing the latching relay LR1 and energizing the latching relay LR2, causing the stepping motor to be actuated. In this manner the stepping motor operates continuously and at a relatively rapid rate to bank space the tape.

As an additional feature, the tape is automatically advanced a predetermined number of steps of the stepping motor responsive to cocking of the tape severing knife. For this operation the knife switch (FIG. 17) is closed, and automatically opened following a predetermined number of steps of advance by the cam 294 associated with the knife switch. Details of this mechanism are given in the copending application of Marcel Jules Helene Staar, filed March 22, 1962, Serial No. 181,545, entitled: Tape Severing Means for Dictating Machine.

Figure 19:
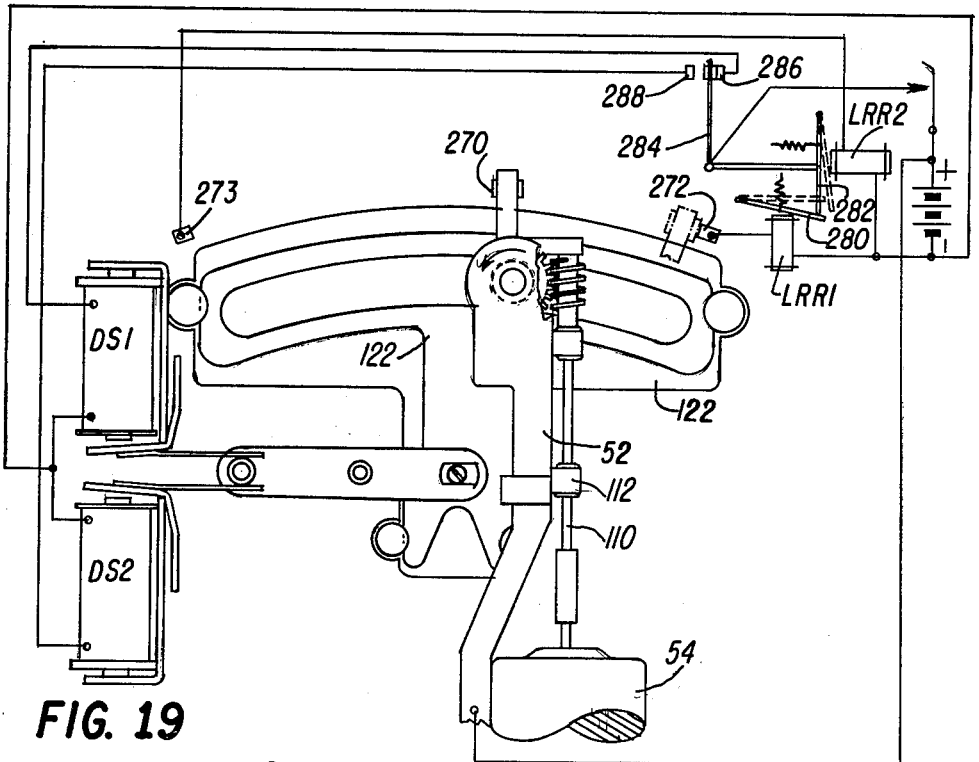
FIG. 19 is a diagrammatic view of a further alternative latching portion of the control means for the reciprocatory drive mechanism.
Figure 18:
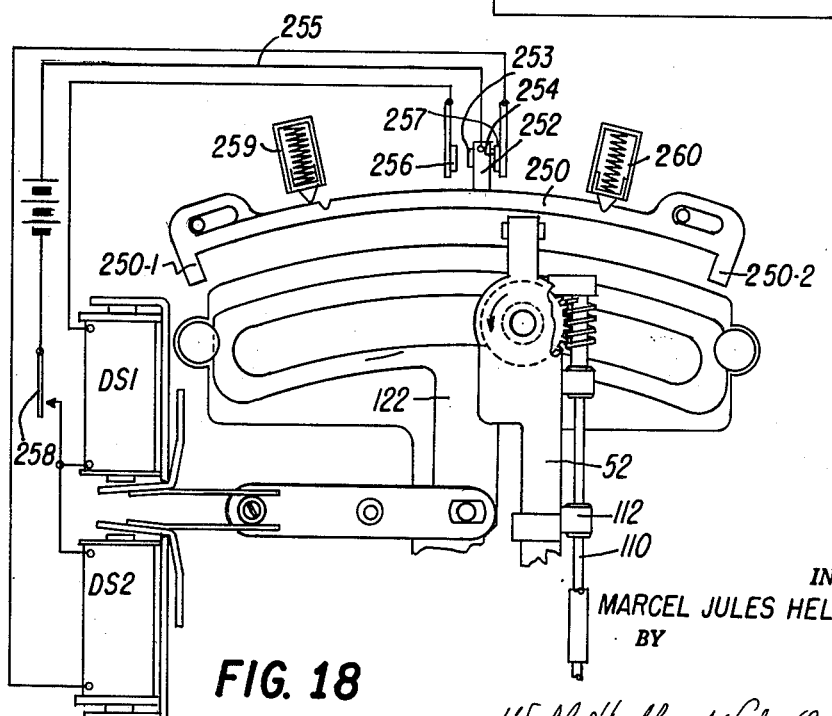
FIG. 18 is a diagrammatic view of an alternative latching portion of the control means for the reciprocatory drive mechanism for the recording and playback head.

Alternative forms of control means for the reciprocatory drive mechanism for the head are shown in FIGS. 18–19. Turning to FIG. 18, mechanical latching means are provided in place of the electrical latching relays of the control circuit of FIG. 17, to reverse the state of the drive solenoids and thereby reverse the direction of movement of the recording head. As shown in FIG. 18, such mechanical latching means includes a sliding segment 250 which carries adjacent each end a stop 250–1, 250–2, one of which is engaged by the arm 52 upon completion of each trace. The segment 250 thus acts as a movable limit switch and carries substantially intermediate its end portions a projection 252 carrying opposed contacts 253, 254 which are electrically energized via the conductor 255 from a source of potential. The contacts 253, 254 which are movable with the segment 250 cooperate respectively with fixed contacts 256, 257. The fixed contacts are connected to the two drive solenoids DS–1 and DS–2. With the power supply switch 258 closed and the drive solenoid connected to the source of potential, a circuit is completed through one or the other fixed contacts 256, 257 according to the position of the movable limit switch or segment. Detent means 259, 260 hold the segment in one terminal position or the other. Thus under the action of the movable arm the segment 250 is slid to energize one or the other of the drive solenoids.

A further alternative form of mechanical latching means is shown in FIG. 19. In this form of the invention movable contacts 270 carried by the arm 52 and electrically energized from the source of potential complete a circuit through fixed contacts 272 or 273 to energize latching relays LRR1 or LRR2. Upon energizing the relay LRR1 by means of a fixed contact 272 at the right side of the drive mechanism, its armature 280 is picked up, the armature 281 of the other latching relay LRR2 is released thereby pivoting the contactor 284 clockwise so as to engage as shown, its contacts with a fixed contact 286 connected in a circuit to the drive solenoid DS1 thereby energizing the same. With the drive solenoid energized, the plate 122 will be pivoted into position to reverse the direction of the arm causing the same to move from right to left.

Upon completion of this trace of the arm and engagement with the fixed contacts 273 by the energized arm 52 and the contact 270 carried thereby, the other latching relay LRR2 is energized thereby pivoting the contactor 284 counterclockwise causing its contacts to engage the fixed contact 288 and close the circuit to the drive solenoid DS2. This reverses the position of the drive plate and causes the direction of motion of the arm 52 to be reversed so that the arm moves from left to right.

It may be noted that the action of the relays LRR1 and LRR2 is totally independent of any interruption of the drive solenoids such that upon interruption in the supply of current to the drive solenoids and reenergization thereof the arm 52 will be caused to travel in the same direction until the trace is fully completed.

I claim as my invention:

1. In apparatus for sound recording and playback on a relatively wide record tape, including means for advancing the tape in even increments of movement, a sound recording and playback head, and means including an arm supporting the head for transverse movement with respect to the tape so that the recording on said tape is in the form of spaced transverse traces across the tape, the combination comprising, a rotary member supported by the arm, power means carried by the arm for rotating said member, and means including an element fixed against transverse movement and engageable with said rotary member so as to produce a reaction force tending to move said arm transversely of the tape.

2. In apparatus for sound recording and playback on a relatively wide record tape, including means for advancing the tape in even increments of movement, a sound recording and playback head, and means including an arm supporting the head for transverse reciprocatory movement with respect to the tape so that the recording on said tape is in the form of spaced transverse traces across the tape, the combination comprising, a rotary member supported by the arm, power means carried by the arm for rotating said member, and means including an element fixed against transverse movement and selectively engageable with one side or the opposite side of said rotary member so as to produce reaction forces tending to move said arm in one direction or the other transversely of the tape.

3. In apparatus for sound recording and playback on a relatively wide record tape, including means for advancing the tape in even increments of movement, a sound recording and playback head, and means including an arm supporting the head for transverse reciprocatory movement with respect to the tape so that the recording on said tape is in the form of spaced transverse traces across the tape, the combination comprising, a rotary member having a vertical axis supported by the arm, said member presenting a forward side and an after side relative to the longitudinal axis of the tape, power means carried by the arm for rotating said member, and means including an element fixed against transverse movement having portions extending transversely of the tape substantially to the sides thereof and selectively engageable with the forward side or the after side of said rotary member so as to produce reaction forces tending to move said arm in one direction or the other transversely of the tape.

4. In apparatus for sound recording and playback on a relatively wide record tape, including means for advancing the tape in even increments of movement, a sound recording and playback head, and means including an arm supporting the head for transverse reciprocatory movement with respect to the tape, the combination comprising, a rotary member supported by the arm, power means carried by the arm for rotating said member, and means fixed against transverse movement coacting with said member on the arm to convert the rotary motion thereof into reciprocatory movement of said arm transversely of the tape synchronized with the increments of advance of the tape so that the recording on said tape is in the form of spaced transverse traces across the tape.

5. In apparatus for sound recording and playback on a relatively wide record tape, including means for advancing the tape in even increments of movement, a sound recording and playback head, and means including a pivotally mounted arm supporting said head so that the recording on said tape is in the form of longitudinally spaced transverse arcuate traces, the combination comprising, a rotary member supported by the arm, power means carried by the arm for rotating said rotary member, and means for reciprocating said arm including a sliding element fixed against transverse movement having a slot receiving said rotary member with the walls of said slot straddling said member, said element being slidable in opposite directions from a neutral position free from engagement with said rotary member to move one wall or the other wall of said slot into engagement with said member so as to produce reaction forces tending to pivot said arm in one direction or the other transversely of the tape.

6. In apparatus for sound recording and playback on a relatively wide record tape, including means for advancing the tape in even increments of movement, a sound recording and playback head, and means including an arm supporting the head for transverse reciprocatory movement with respect to the tape, the combination comprising, a rotary member supported by the arm, power means carried by the arm for rotating said member, and means for reciprocating said head in synchronism with the advance of the tape including a sliding element fixed against transverse movement having an elongated slot with parallel walls extending transversely of the tape substantially the full width thereof, said rotary member being received between the walls of said slot, said element being slidable in opposite directions to move one wall or the other wall of said slot into engagement with said rotary member so as to produce reaction forces tending to move said arm in one direction or the other transversely of the tape, and means for shifting the position of said element and for incrementally advancing the tape automatically responsive to completion of each transverse trace of the head at the sides of the tape so that the recording on said tape is in the form of spaced transverse traces across the tape.

7. In apparatus for sound recording and playback on a relatively wide record tape, including means for advancing the tape in even increments of movement, a sound recording and playback head, and means including an arm supporting the head for transverse reciprocatory movement with respect to the tape so that the recording on said tape is in the form of spaced transverse traces across the tape, the combination comprising, a rotary member supported by the arm, power means carried by the arm for rotating said member, and means for reciprocating said head in synchronism with the advance of the tape including a sliding element fixed against transverse movement having an elongated slot with parallel walls extending transversely of the tape substantially to the sides thereof, said rotary member being received between the walls of said slot, said element being slidable in opposite directions from a neutral position free from engagement with said rotary member to move one wall or the other wall of said slot into engagement with said member so as to produce reaction forces tending to move said arm in one direction or the other transversely of the tape, and means for shifting the position of said element to reverse the direction of movement of the arm and for incrementally advancing the tape automatically responsive to completion of each transverse trace of the head at the sides of the tape.

8. In apparatus for sound recording and playback on a relatively wide record tape, including means for advancing the tape in even increments of movement, a sound recording and playback head, and means including an arm supporting the head for transverse reciprocatory movement with respect to the tape so that the recording on said tape is in the form of spaced transverse traces across the tape, the combination comprising, a rotary member supported by the arm, power means carried by the arm for rotating said member, and means for reciprocating said head in synchronism with the advance of the tape including a sliding element fixed against transverse movement having an elongated slot with parallel walls extending transversely of the tape substantially to the sides thereof, said rotary member being received between the walls of said slot, said element being slidable in opposite directions from a neutral position free from engagement with said rotary member to move one wall or the other of said slot into engagement with said member so as to produce reaction forces tending to move said arm in one direction or the other transversely of the tape, a pair of solenoids connected to said element to slide the latter selectively in said opposite directions, and means for alternatively energizing said solenoids to slide said element and thereby reverse the direction of movement of the arm including switches actuated responsive to completion of each transverse trace of the head at the side of the tape.

9. In apparatus for sound recording and playback on a relatively wide record tape, including means for advancing the tape in even increments of movement, a sound recording and playback head, and means including an arm supporting the head for transverse reciprocatory movement so that the recording on said tape is in the form of spaced transverse traces, the combination comprising, a rotary member supported by the arm, power means carried by the arm for rotating said member, and means for reciprocating said head in synchronism with the advance of the tape including a sliding element fixed against transverse movement having an elongated slot with walls extending transversely of the tape, said rotary member being received between the walls of said slot, said element being slidable in opposite directions from a neutral position free from engagement with said rotary member to move one wall or the other wall of said slot into engagement with said member so as to produce reaction forces tending to move said arm in one direction or the other transversely of the tape, a pair of solenoids connected to said sliding member to move the latter selectively in said opposite directions, and means for alternatively energizing said solenoids to reverse the direction of movement of the arm responsive to the completion of each transverse trace of the head at the sides of the tape, comprising an electrical circuit including said solenoids and latch means mechanically actuated responsive to completion of each transverse trace of the head at the sides of the tape thereby alternatively to latch one of said solenoids in said circuit and to release the other of said solenoids and shift said element to reverse the direction of movement of the arm, said latch means maintaining the same direction of movement of the arm until each trace is completed independent of any interruption in energization of the solenoids.

10. The invention according to claim 9 wherein said latch means is in the form of a movable limit switch mechanically slid by the movable arm at the completion of each transverse trace of the head at the sides of the tape thereby closing one set of contacts electrically connected to one of said solenoids latching the latter in said circuit and opening another set of contacts electrically connected to the other of said solenoids releasing the latter and shifting said element to reverse the direction of movement of the arm.

11. The invention according to claim 9 wherein said latch means is in the form of a pair of relays electrically connected to contacts respectively of limit switches activated by the movable arm at the completion of each transverse trace of the head at the sides of the tape so that one of said relays is energized, said relays having a two-position latching switch connected to said solenoids for alternatively latching one of said solenoids in said circuit and releasing the other shifting said element to reverse the direction of movement of the arm and maintaining the same direction of movement of the arm independent of any interruption in energization of the solenoids.

12. In apparatus for sound recording and playback on a relatively wide record tape, having evenly spaced openings longitudinally of the tape, including a sound recording and playback head supported for transverse reciprocatory movement with respect to the tape, the combination comprising, selectively operable power means for moving the head at uniform speed transversely of the tape in either direction, drive means for the tape including a sprocket engageable in said openings in the tape, a reversible stepping motor having a rotor connected to said sprocket for moving the tape longitudinally in either direction in even steps, means for actuating said stepping motor to advance the tape one step responsive to completion of each transverse trace of the head, means for alternately operating said power means in synchronism with the rotor so as to maintain the same direction of movement of the head for alternate circumferential positions of the rotor and corresponding positions of the tape, thereby reversing the direction of movement of the head upon each single step of the stepping motor at the completion of each transverse recording trace so that the recording on said tape is in the form of spaced transverse traces extending across the tape, and a manually operable member mechanically connected to said sprocket and movable manually in either direction to advance or return the tape to a desired position, the direction of movement of the head and the position of the tape being synchronized.

13. In apparatus for sound recording and playback including a sound recording and playback head, and means including an arm pivotally mounted at one end and supporting the head adjacent the free end of the arm for transverse reciprocatory movement; a reciprocatory drive mechanism for said arm comprising a drive roller having a vertical axis supported by the arm, power means carried by the arm for rotating said roller including a motor fixed to the arm and drivingly connected to said roller, and a movable element coacting with said drive roller to convert the rotary motion thereof into reciprocating movement of the arm, said element having an arcuate slot extending along the path of said drive roller with walls straddling said roller, said element being movable generally perpendicular to the axis of the slot to alternatively engage one wall and the other wall thereof with said drive roller, said element being fixed against movement parallel to the axis of said slot thereby producing reaction forces tending to pivot said arm in one direction and the other upon such alternate engagement and continuous rotation of said drive roller by said motion.

14. In apparatus for sound recording and playback including a sound recording and playback head, and means including an arm pivotally mounted at one end and supporting the head adjacent the free end of the arm for transverse reciprocatory movement; a reciprocatory drive mechanism for said arm comprising a drive roller having a vertical axis supported by the arm, power means carried by the arm for rotating said roller including a motor fixed to the arm and drivingly connected to said roller, and a movable element coacting with said drive roller to convert the rotary motion thereof into reciprocating movement of the arm, said element having an arcuate slot extending along the path of said drive roller with walls straddling said roller, said element being movable generally perpendicular to the axis of the slot to alternately engage one wall and the other wall thereof with said drive roller, said element being fixed against movement parallel to the axis of the slot thereby producing reaction forces tending to pivot said arm in one direction and the other upon such alternate engagement and continuous rotation of said drive roller by said motor.

15. In apparatus for sound recording and playback including a sound recording and playback head, and means including an arm pivotally mounted at one end and supporting the head adjacent the free end of the arm for transverse reciprocatory movement; a reciprocatory drive mechanism for said arm comprising a drive roller having a vertical axis supported by the arm, power means carried by the arm for rotating said roller including a motor fixed to the arm and drivingly connected to said roller, a movable element coacting with said drive roller to convert the rotary motion thereof into reciprocating movement of the arm, said element having an arcuate slot extending along the path of said drive roller with walls straddling said roller, said element being movable generally perpendicularly to the axis of the slot to alternately engage one wall and the other wall thereof with said drive roller, said element being fixed against movement parallel to the axis of the slot thereby producing reaction forces tending to pivot said arm in one direction and the other upon such alternate engagement and continuous rotation of said drive roller by said motor, and means yieldingly urging said element to a neutral position with both walls of said slot free from engagement with said drive roller.

16. In apparatus for sound recording and playback including a frame, a sound recording and playback head, and means including an arm pivotally mounted at one end on said frame and supporting the head adjacent the free end of the arm for transverse reciprocatory movements such that the head describes arcuate traces; a reciprocatory drive mechanism for said arm comprising a rotary drive roller having a vertical axis supported by the arm, power means for rotating said drive roller including a motor carried by said arm spaced from said roller and drivingly connected thereto, and means supported by the frame fixed against movement generally parallel to the arcuate traces of the head and engageable with the roller to convert rotary motion thereof into reciprocatory movement of said arm.

17. In apparatus for sound recording and playback including a frame, a sound recording and playback head, and means including an arm pivotally mounted at one end on said frame and supporting the head adjacent the free end of the arm for transverse reciprocatory movement; a reciprocatory drive mechanism for said arm comprising a drive roller having a vertical axis supported by the arm, power means carried by the arm for rotating said roller including a motor fixed to the arm and drivingly connected to said roller, and a movable element mounted on said frame coacting with said drive roller to convert the rotary motion thereof into reciprocating movement of the arm, said element having an arcuate slot extending along the path of said drive roller with walls straddling said roller, said element being mounted solely for straight line movement generally perpendicularly to the axis of the slot to alternately engage one wall and the other wall thereof with said drive roller, producing reaction forces tending to pivot said arm in one direction and the other upon such alternate engagement and continuous rotation of said drive roller by said motor, a lever pivotally mounted on the frame, a pair of axially aligned solenoids arranged normal to the lever and connected thereto on one side of the pivot, and means having lost motion connecting said element to the lever on the opposite side of the pivot such that pivotal motion of the lever by said solenoids produces straight line movement of the element.

18. In apparatus for sound recording and playback on a relatively wide magnetic tape, including means for advancing the tape, a sound recording and playback head and means including an arm supporting the head for transverse reciprocatory traces across the tape, the combination comprising, reciprocatory drive mechanism for the arm, and means for controlling said drive mechanism to reverse the direction of movement of the arm including yielding means stressed on the completion of each trace by the arm and imparting an impulse to the arm at the start of the return trace to obtain rapid reversal and recovery to recording speed.

19. In apparatus for sound recording and playback on a relatively wide magnetic tape, including means for advancing the tape, a sound recording and playback head and means including an arm supporting the head for transverse reciprocatory traces across the tape, the combination comprising, reciprocatory drive mechanism for the arm, and means for controlling said drive mechanism to reverse the direction of movement of the arm including yielding means positioned adjacent both ends of the path of the arm so as to be stressed in the course of each trace by the arm imparting an impulse to the arm at the start of the return trace to obtain rapid reversal and recovery to recording speed.

20. In apparatus for sound recording and playback on a relatively wide magnetic tape, including means for advancing the tape, a sound recording and playback head and means including an arm supporting the head for transverse reciprocatory traces across the tape, the combination comprising reciprocatory drive mechanism for the arm, and electrical means for controlling said drive mechanism to reverse the direction of movement of the arm including switches having yielding contacts positioned adjacent both ends of the path of the arm and engaged by the arm at the completion of each trace imparting an impulse to the arm at the start of the return trace to obtain rapid reversal and recovery to recording speed.

21. In apparatus for sound recording and playback on a relatively wide magnetic tape, including means for advancing the tape, a sound recording and playback head and means including an arm supporting the head for transverse reciprocatory traces across the tape, the combination comprising, reciprocatory drive mechanism for the arm, and electrical means for controlling said drive mechanism to reverse the direction of movement of the arm including yielding switch means positioned adjacent both ends of the path of the arm so that the arm continues beyond the point of actuation of said switch means for a predetermined period and continues to stress the latter, the yielding switch means imparting an impulse to the arm at the start of the return trace to obtain rapid reversal and recovery to recording speed.

References Cited in the file of this patent

UNITED STATES PATENTS

| | | |
|---|---|---|
| 2,640,700 | Mortimer | June 2, 1953 |
| 2,646,283 | Doncaster | July 21, 1953 |
| 2,922,654 | Brasseur | Jan. 26, 1960 |
| 2,938,731 | Meyer | May 31, 1960 |
| 2,964,324 | Brasseur | Dec. 13, 1960 |
| 3,018,353 | Mitchell | Jan. 23, 1962 |

FOREIGN PATENTS

| | | |
|---|---|---|
| 885,487 | Great Britain | Dec. 28, 1961 |